United States Patent
Walker

(10) Patent No.: US 11,314,082 B2
(45) Date of Patent: Apr. 26, 2022

(54) MOTION SIGNAL GENERATION

(71) Applicant: Sony Interactive Entertainment Inc., Tokyo (JP)

(72) Inventor: Andrew William Walker, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/649,491

(22) PCT Filed: Aug. 2, 2018

(86) PCT No.: PCT/GB2018/052214
§ 371 (c)(1),
(2) Date: Mar. 20, 2020

(87) PCT Pub. No.: WO2019/063962
PCT Pub. Date: Apr. 4, 2019

(65) Prior Publication Data
US 2020/0241291 A1 Jul. 30, 2020

(30) Foreign Application Priority Data

Sep. 26, 2017 (GB) .................... 1715557
Oct. 12, 2017 (GB) .................... 1716731

(51) Int. Cl.
*G02B 27/00* (2006.01)
*G02B 27/01* (2006.01)
(Continued)

(52) U.S. Cl.
CPC ..... *G02B 27/0093* (2013.01); *G02B 27/0101* (2013.01); *G02B 27/0172* (2013.01);
(Continued)

(58) Field of Classification Search
CPC ........... G02B 27/0093; G02B 27/0101; G02B 27/0172; G02B 27/0179; G02B 2027/014;
(Continued)

(56) References Cited

U.S. PATENT DOCUMENTS 10,585,472 B2 *  3/2020  Tokubo ............... G09G 5/14
2010/0141555 A1 *  6/2010  Rorberg ............ G02B 27/017
345/8

(Continued)

FOREIGN PATENT DOCUMENTS

WO   2017161276 A1   9/2017

OTHER PUBLICATIONS

International Search Report and Written Opinion for corresponding PCT Application No. PCT/GB2018/052214, 12 pages, dated Oct. 10, 2018.

(Continued)

*Primary Examiner* — Ibrahim A Khan
(74) *Attorney, Agent, or Firm* — Matthew B. Dernier, Esq.

(57) ABSTRACT

A motion signal generation apparatus includes a detector to detect one or more image features of images generated by a data processing apparatus; and a generator, responsive to an image location of the one or more detected image features and to a current simulated orientation of a head mountable display (HMD), to generate a motion signal to simulate head motion by a wearer of the HMD.

20 Claims, 17 Drawing Sheets

(51) Int. Cl.
*G06F 3/01* (2006.01)
*G06F 3/16* (2006.01)

(52) U.S. Cl.
CPC ......... *G02B 27/0179* (2013.01); *G06F 3/012* (2013.01); *G06F 3/167* (2013.01); *G02B 2027/014* (2013.01); *G02B 2027/0187* (2013.01)

(58) Field of Classification Search
CPC .......... G02B 2027/0187; G02B 27/017; G06F 3/012; G06F 3/167; G06F 3/04815; G06F 11/34
See application file for complete search history.

(56) References Cited

U.S. PATENT DOCUMENTS

| | | | |
|---|---|---|---|
| 2011/0009241 A1* | 1/2011 | Lane | A63B 24/0087 482/8 |
| 2012/0134543 A1 | 5/2012 | Fedorovskaya | |
| 2013/0246967 A1* | 9/2013 | Wheeler | G02B 27/0093 715/784 |
| 2013/0293447 A1 | 11/2013 | Bickerstaff | |
| 2013/0326364 A1* | 12/2013 | Latta | G02B 27/017 715/751 |
| 2014/0160001 A1* | 6/2014 | Kinnebrew | G06F 3/0482 345/156 |
| 2014/0267420 A1* | 9/2014 | Schowengerdt | G09G 3/007 345/633 |
| 2015/0143297 A1* | 5/2015 | Wheeler | G06F 3/0482 715/830 |
| 2015/0287245 A1* | 10/2015 | Ermann | G06T 19/006 345/633 |
| 2016/0026253 A1* | 1/2016 | Bradski | H04N 13/167 345/8 |
| 2016/0189429 A1* | 6/2016 | Mallinson | G02B 27/017 345/633 |
| 2017/0359467 A1* | 12/2017 | Norris | H04S 7/304 |
| 2018/0130264 A1* | 5/2018 | Ebacher | G06F 3/04815 |
| 2018/0249274 A1* | 8/2018 | Lyren | H04S 7/303 |
| 2018/0275837 A1* | 9/2018 | Getz | G06F 3/017 |
| 2018/0299948 A1* | 10/2018 | Kikuchi | G06F 3/017 |

OTHER PUBLICATIONS

Search and Examination Report for corresponding GB Application No. 1716731.3, 3 pages, dated Mar. 21, 2018.
Search and Examination Report for corresponding GB Application No. 1715557.3, 3 pages, dated Mar. 9, 2018.
Examination Report for corresponding GB Application No. 1716731.3, 3 pages, dated Oct. 28, 2019.
Communication Pursuant to Article 94(3) for corresponding EP Application No. 18755270.8, 6 pages, dated Sep. 24, 2021.

* cited by examiner

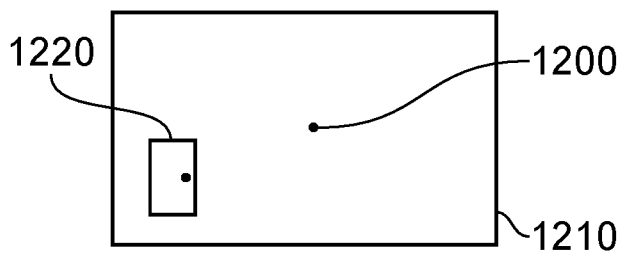 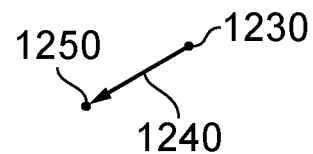
FIG. 12a    FIG. 12b
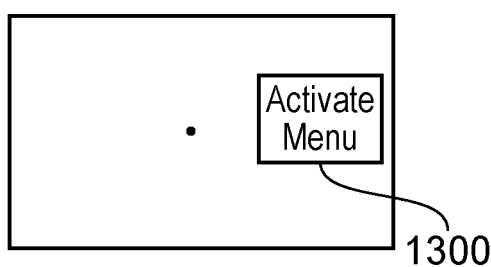 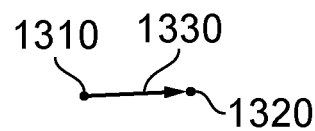
FIG. 13a    FIG. 13b
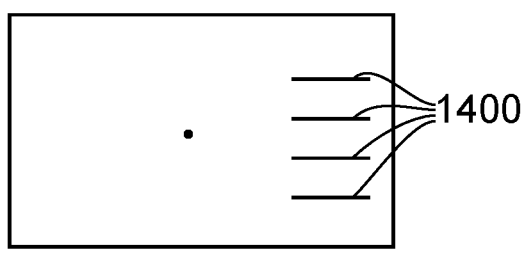 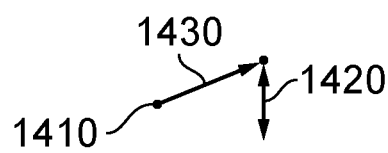
FIG. 14a    FIG. 14b
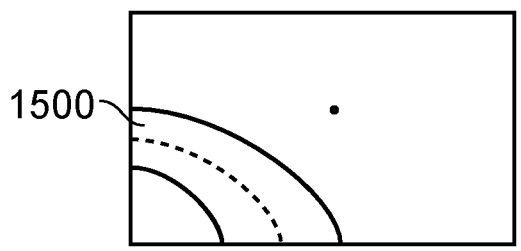 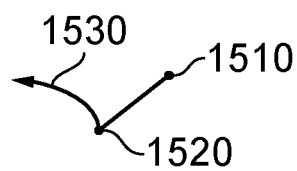
FIG. 15a    FIG. 15b
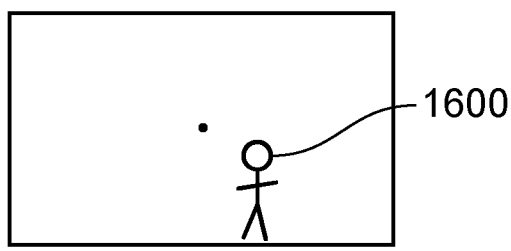 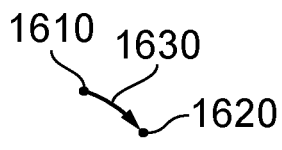
FIG. 16a    FIG. 16b

MOTION SIGNAL GENERATION

BACKGROUND

Field of the Disclosure

This disclosure relates to motion signal generation.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

It has been proposed to provide detection arrangements for detecting a relative location of one device (such as an HMD) from another device, by using a camera on the one device to detect images of one or more markers, for example on the other device.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure provides a motion signal generation apparatus comprising:
a detector to detect one or more features of a virtual environment generated by a data processing apparatus; and
a generator, responsive to an environment location of the one or more detected features and to a current simulated orientation of a head mountable display (HMD), to generate a motion signal to simulate head motion by a wearer of the HMD.

The present disclosure also provides a motion signal generation apparatus comprising:
a detector to detect one or more image features of images generated by a data processing apparatus; and
a generator, responsive to an image location of the one or more detected image features and to a current simulated orientation of a head mountable display (HMD), to generate a motion signal to simulate head motion by a wearer of the HMD.

The present disclosure also provides a method comprising:
detecting one or more features of a virtual environment generated by a data processing apparatus; and
generating, in response to an environment location of the one or more detected features and to a current simulated orientation of a head mountable display (HMD), a motion signal to simulate head motion by a wearer of the HMD.

The present disclosure also provides a method comprising:
detecting one or more image features of images generated by a data processing apparatus; and
generating, in response to an image location of the one or more detected image features and to a current simulated orientation of a head mountable display (HMD), a motion signal to simulate head motion by a wearer of the HMD.

Example embodiments provide computer software which, when executed by a computer, causes the computer to perform the steps of any one of the methods defined above.

Example embodiments provide a machine-readable, non-transitory storage medium which stores such computer software.

Various other aspects and features of the present disclosure are defined in the appended claims and within the text of the accompanying description and include at least a computer software and a non-transitory machine-readable medium which stores such computer software.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 12*a*, 13*a*, 14*a*, 15*a* and 16*a* schematically represent respective example images;
FIGS. 12*b*, 13*b*, 14*b*, 15*b* and 16*b* schematically represent respective examples of simulated head motion.

DESCRIPTION OF THE EMBODIMENTS

Figure 1:
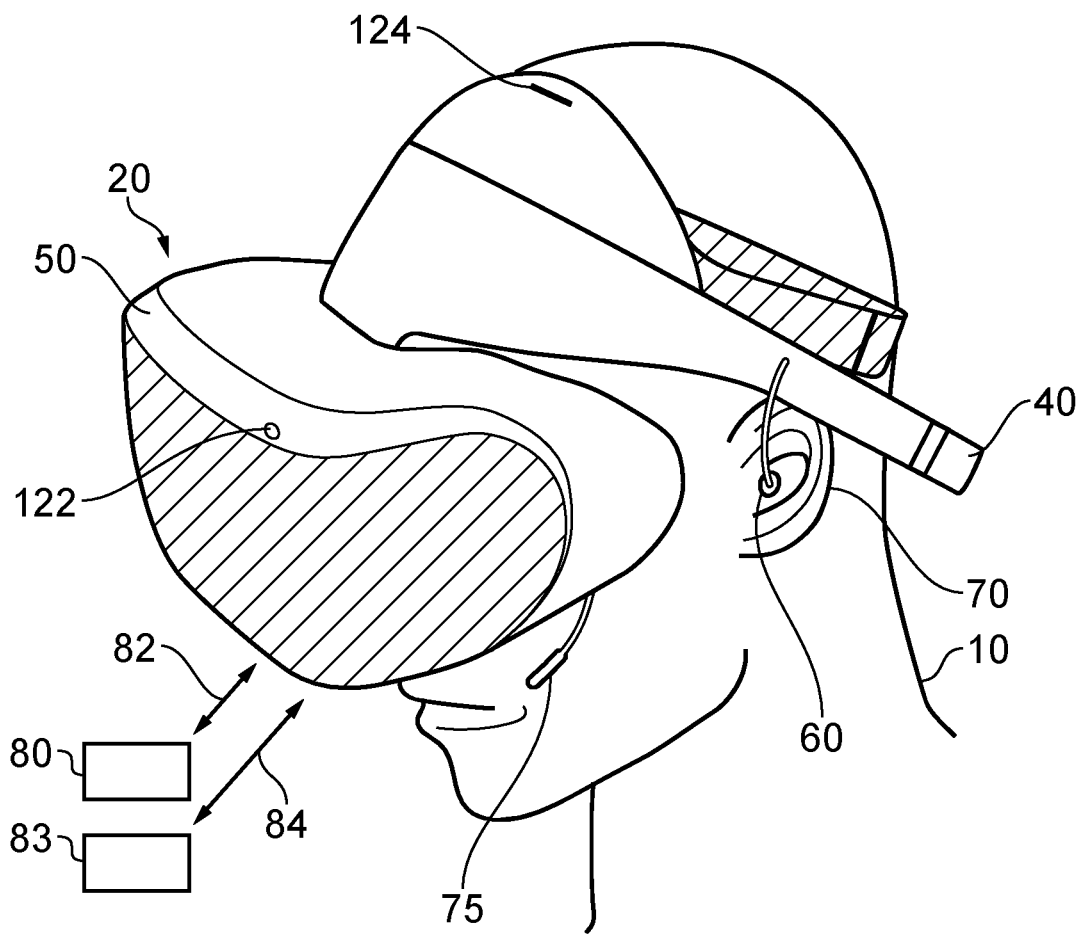
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
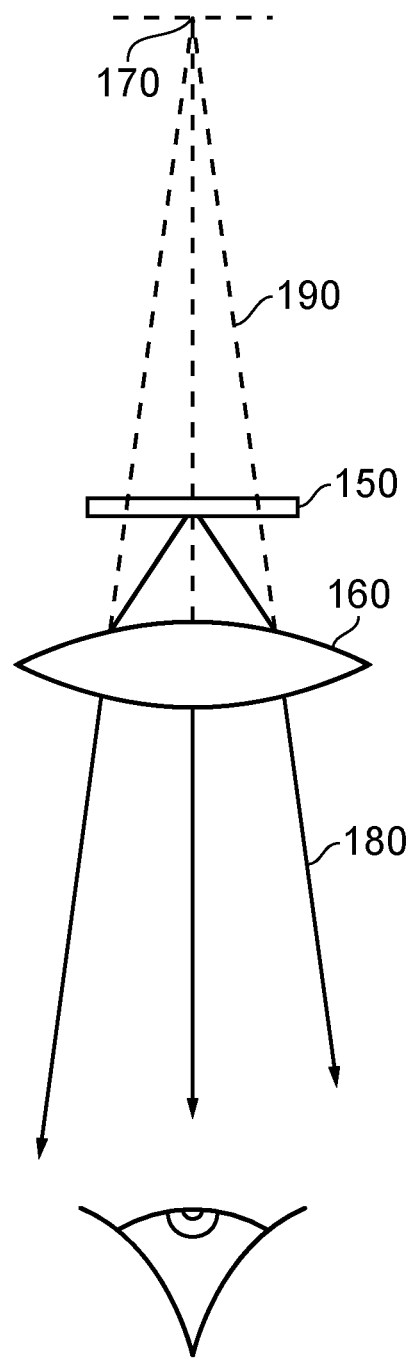
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
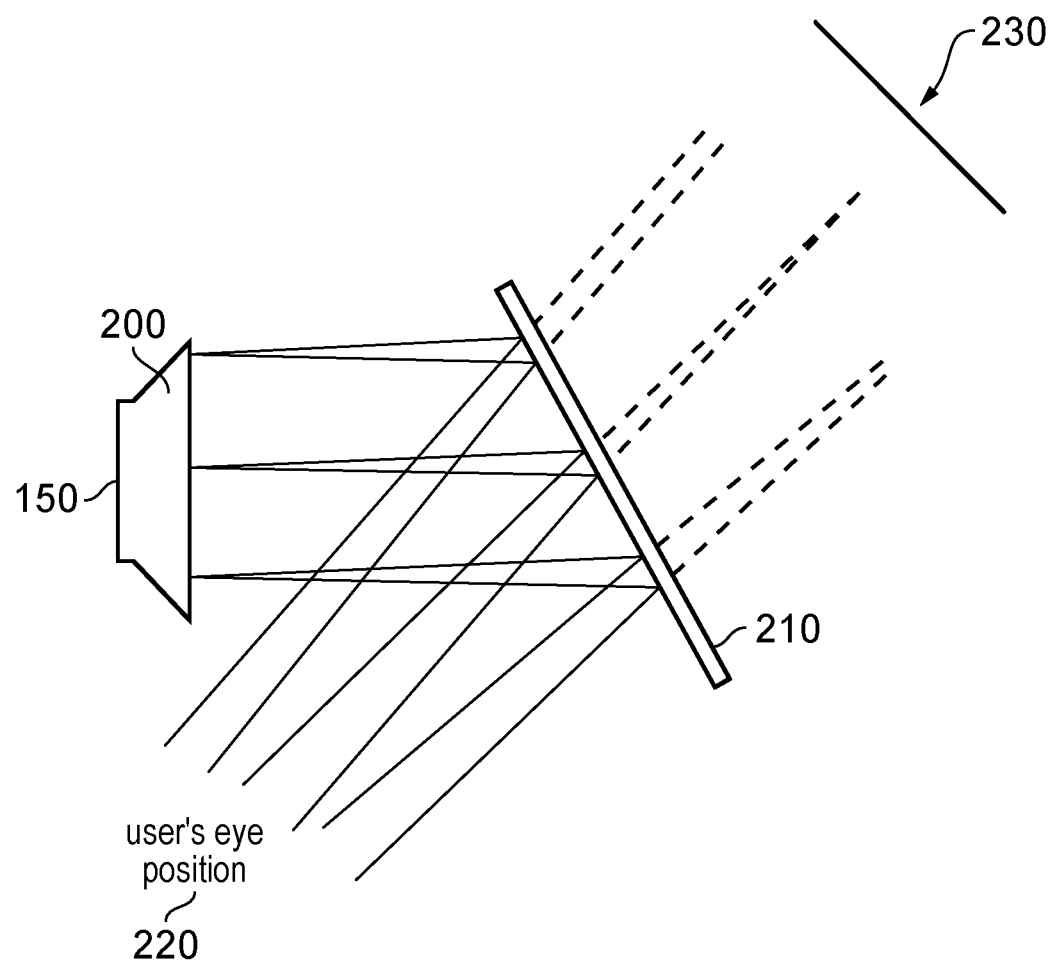
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
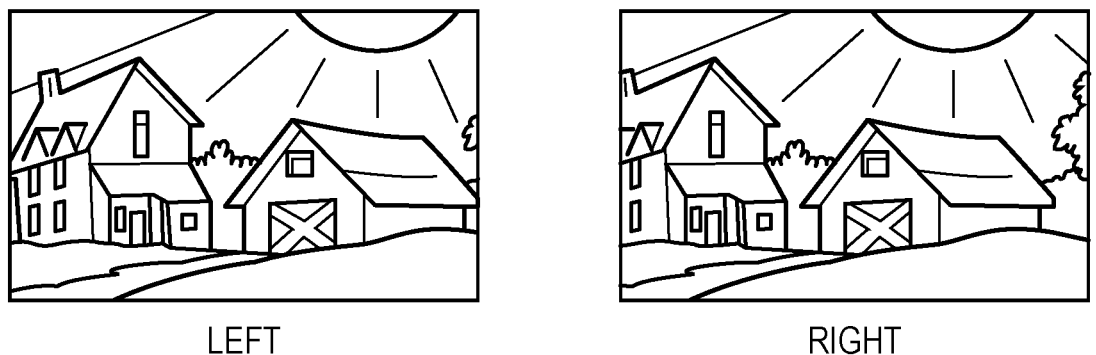
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
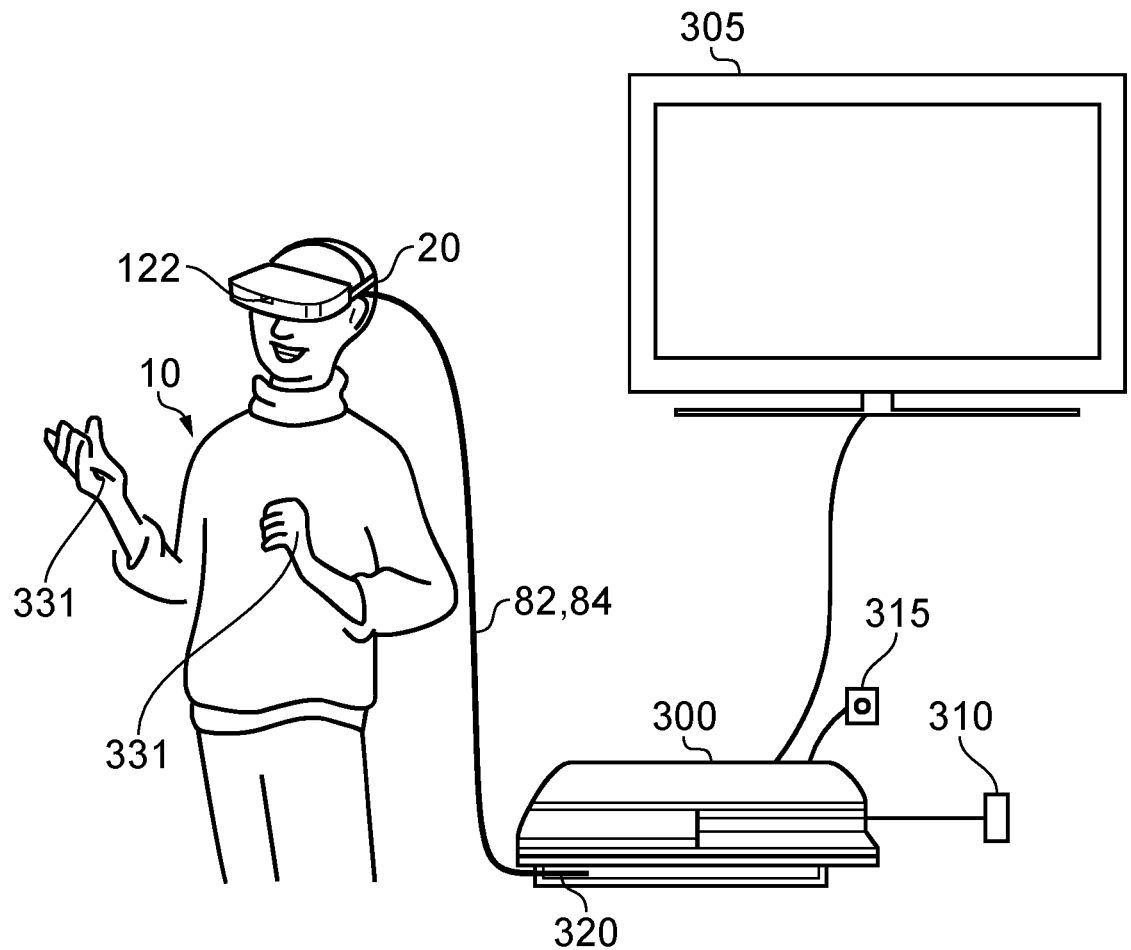
FIGS. 6 and 7 schematically illustrate a user wearing an HMD connected to a Sony® PlayStation® games console.

FIG. 6 schematically illustrates an example virtual reality system and in particular shows a user wearing an HMD connected to a Sony® PlayStation® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see (and in some cases hear) the virtual environment (or a subset, version or representation of it) as seen and heard by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing as discussed below.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
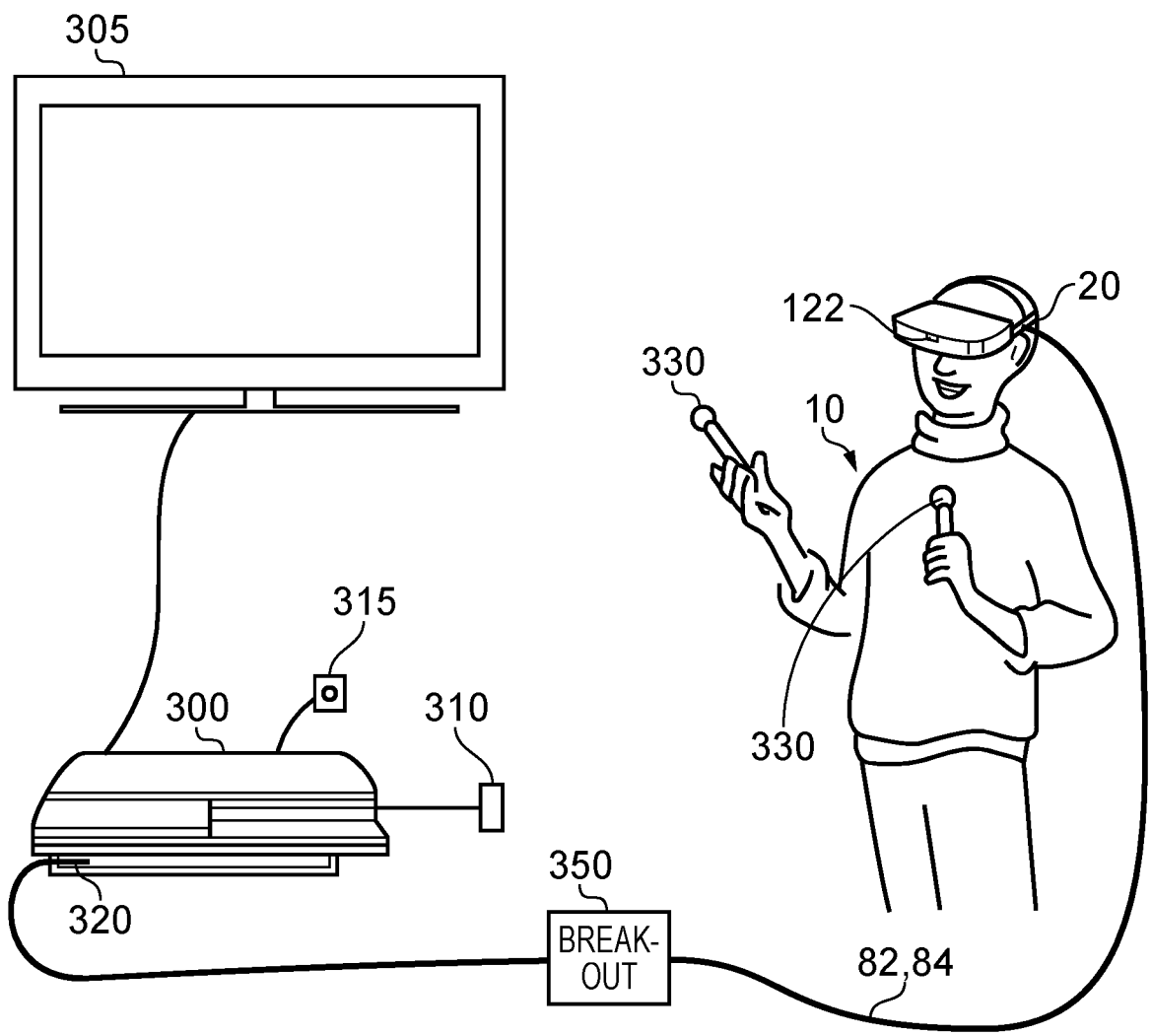

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330s which may be, for example, Sony® Move® controllers which communicate wirelessly with the games console 300 to control (or to contribute to the control of) game operations relating to a currently executed game program. the user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
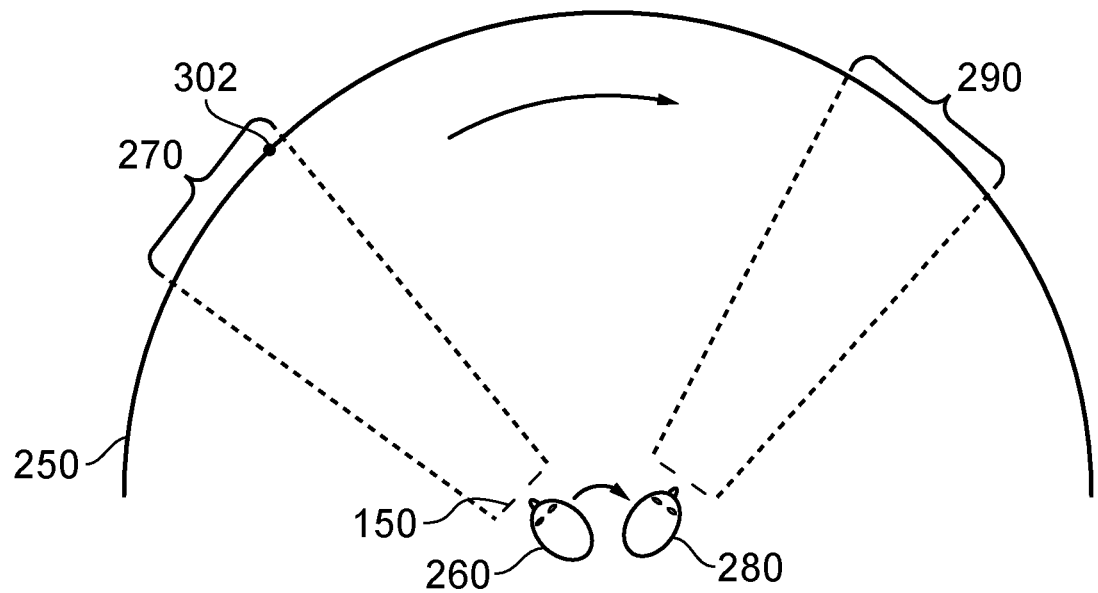
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
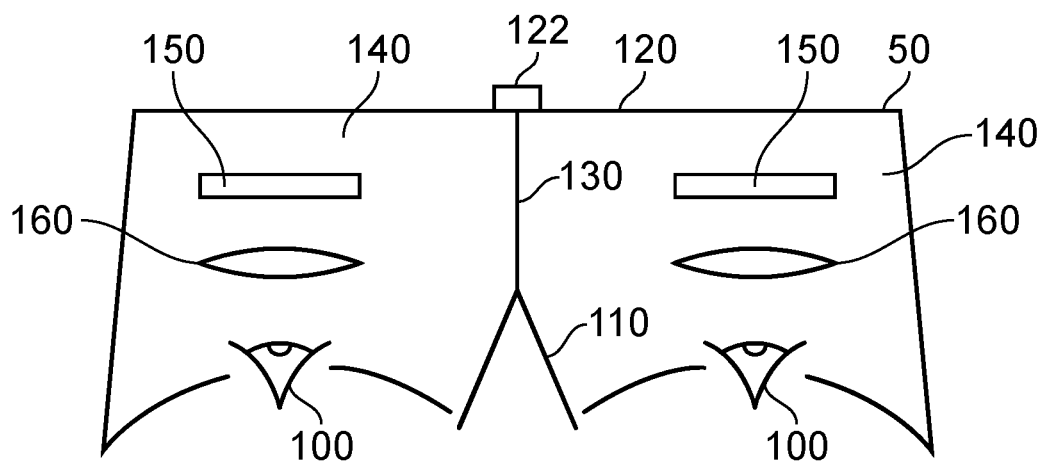
FIG. 2 is a schematic plan view of an HMD.
Figure 9A:
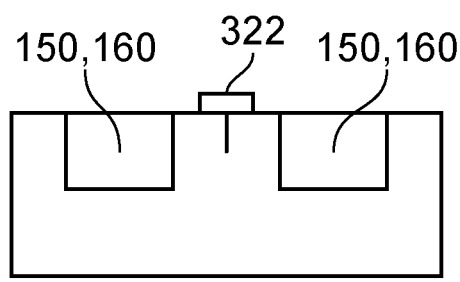
FIGS. 9*a* and 9*b* schematically illustrate HMDs with motion sensing.
Figure 9B:
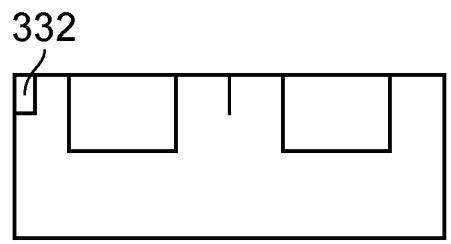

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezo-electric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
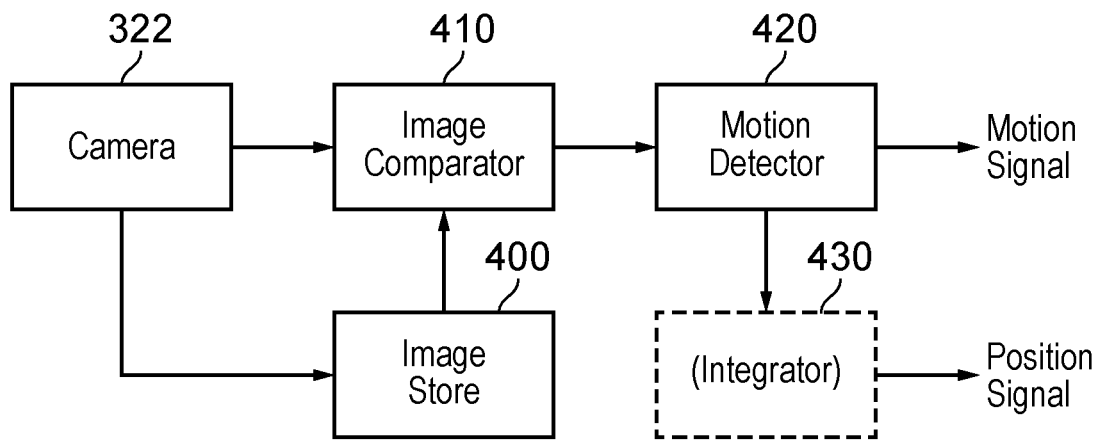
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
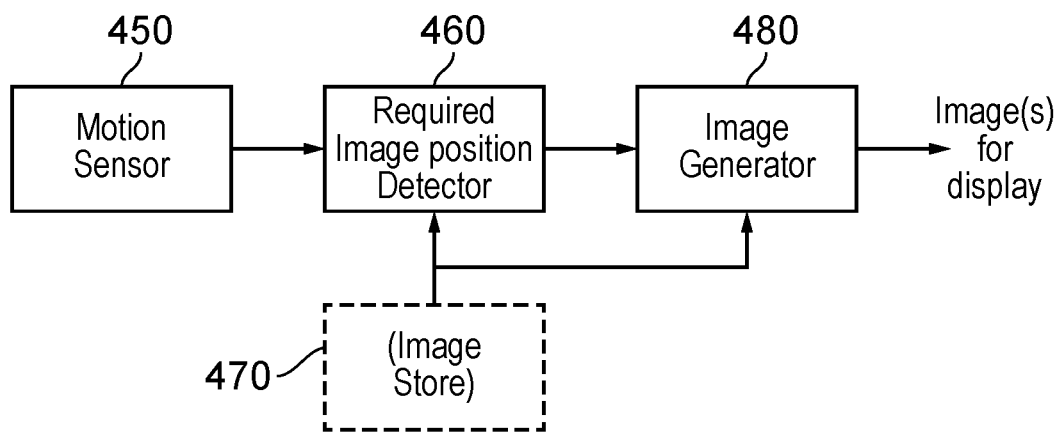
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

In the context of the motion detection and image display arrangements shown in FIGS. 10 and 11 and described above, FIGS. 12a, 13a, 14a, 15a and 16a schematically represent respective sample images. These images might be displayed as part of the ongoing progress of a computer games program being executed by the computer games apparatus described above. The images represent the viewpoint of an HMD wearer. Although the HMD wearer would (in at least some examples) see the images as a three-dimensional representation, for example one which may be represented by a pair of left and right images, a single representation is shown in FIGS. 12a, 13a, 14a, 15a and 16a for clarity.

In each case, a point 1200 at the centre of the representation of the displayed image indicates a current viewpoint of the HMD. That is to say, the HMD is assumed to be currently pointing centrally with respect to the currently displayed images, so that a displacement of the HMD to one side will cause the displayed images to be rotated or displaced as shown in FIG. 8, for example, so that different image content is displayed with respect to the prevailing viewpoint of the HMD.

Therefore, the arrangements discussed above are arranged to generate a representation of a virtual environment. This may include images indicative of the virtual environment, for example with respect to a user's current location and orientation in the virtual environment, and/or audio features (such as sounds) which again may be localised (by the use of stereo and/or binaural representations via the earpieces 60, for example) in the virtual environment, for example relative to the user's current location and orientation in the virtual environment.

FIGS. 12b, 13b, 14b, 15b and 16b schematically illustrate examples of head motion. The head motion may be in response to the respective displayed image as explained below.

The head motion represented by FIGS. 12b ... 16b can be real head motion in the case of the arrangements of FIGS. 10 and 11 described above, or simulated head motion in the case of the arrangements to be described below.

Referring to FIGS. 12a and 12b, the example image 1210 includes an image feature 1220, shown schematically in this representation as a doorway. This is an example of a virtual environment feature. Another example is a sound at a particular perceived location in the virtual environment. In response to this image feature, the user is assumed to undertake head motion from a starting orientation 1230 in a direction 1240 towards a target location or viewpoint 1250, so as to look towards the doorway 1220. For example, although not shown in FIG. 12a, looking towards the doorway may trigger the games machine to cause the user to pass through that doorway in the virtual environment being displayed to the user, and so move into a different area of the virtual environment.

Another example is shown schematically in FIGS. 13a and 13b, in which a control display 1300, for example representing an "activate menu" command, is displayed. From a starting position 1310, the user moving the HMD so as to direct the viewpoint to the HMD to a target location 1320, for example by a route 1330, causes the viewpoint of the HMD to be directed at the control display 1300 and the menu to be activated.

FIGS. 14a and 14b schematically represent such a menu when activated, in which a plurality of menu items 1400 are displayed. Here, the user might be expected to start from a starting position 1410 and direct the prevailing viewpoint of the HMD towards one or more of a range 1420 of locations, for example via a route 1430, so as to select one of the menu items 1400.

In FIGS. 15a and 15b, a schematic road 1500 is displayed. If the user wishes to pass along the road 1500 in the displayed virtual environment, the user might start from a starting position 1510, move towards a first target location 1520 on the road 1500 and then move along the road by a path 1530.

FIGS. 16a and 16b schematically illustrate examples in which an avatar 1600 is displayed, for example of a co-member of the user's team in a cooperative game or an enemy in, for example, a first person game. The user might be expected to start from a starting position 1610 and move towards a target location 1620, for example by a path 1630, so as to look directly at the avatar 1600.

As mentioned above, the example arrangements of FIGS. 12a ... 16b represent situations which could arise within game play in a computer games system. When such a computer system is operated, it is desirable that the user enjoys the gameplay experience but is not subjected to unreasonable or excessive requirements for head motion in order to enjoy that experience. If the user was subjected to a requirement for excessive or unreasonable head motion in order to play the game (or carry out another data processing function in the case of a different type of data processing apparatus) this could lead to pain or discomfort on the part of the user and potentially decrease the popularity of the game program. So, in order to avoid this, it can be useful to undertake so-called quality control (QC) testing.

QC testing can encompass many aspects of the operation of a game program, for example checking that the game narrative flows appropriately depending on different user ability or choices made by the user during gameplay. But in the present context, QC testing can be carried out to assess whether the extent of head motion required by the user to execute the gameplay is perceived to be excessive.

One way to conduct QC testing is to employ one or more QC testing users, equip each such QC testing user with a HMD and a games machine, and have the QC testing user(s) play the game multiple times, wearing the HMD. However, in the case of investigating the question of whether excessive head motion is involved, this would be a subjective report by the QC testing users, and acquiring this information could be time consuming and potentially expensive. Therefore, according to embodiments of the present disclosure, QC testing to detect the extent of required head motion can be carried out automatically, without even the need for at least in some examples for a physical HMD to be used. Techniques by which this can be achieved will be discussed below.

Figure 17:
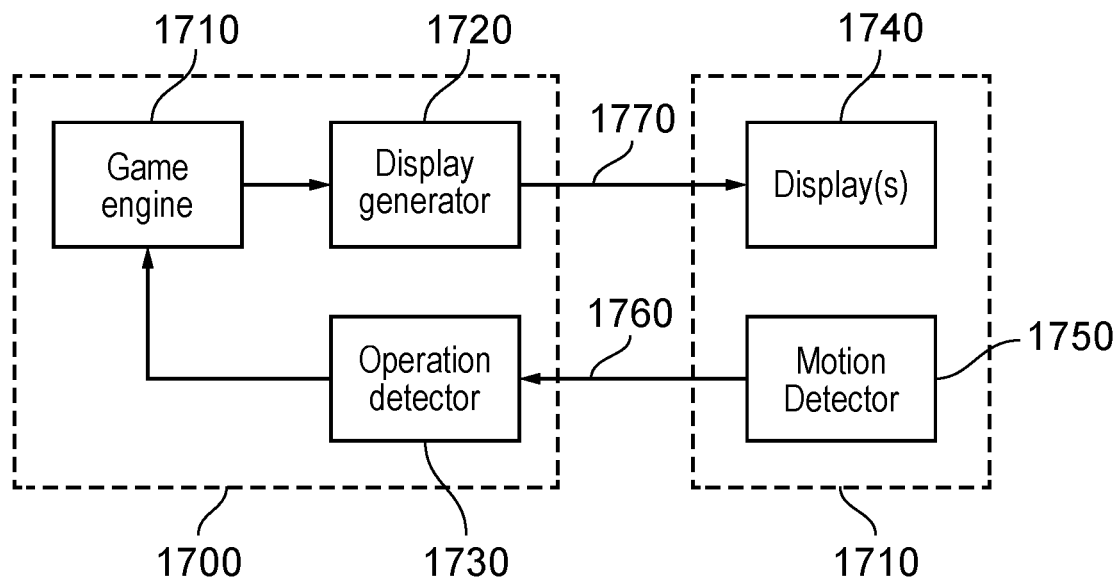
FIG. 17 schematically illustrates a games machine and an HMD.

FIG. 17 schematically illustrates an example games machine 1700 and HMD 1710 of the type discussed above.

The games machine 1700, shown in simplified form for clarity of the present explanation, comprises a game engine 1710, a display generator 1720 and an operation detector 1730. The HMD, again shown in simplified form for clarity of the present explanation, comprises one or more displays 1740, such as one display for each of the user's eyes, and a motion detector 1750, such as a motion detector of one or more of the types discussed above, to detect motion of the HMD in use. The display generator 1720 provides images 1770 generated by the games machine 1700 to the displays 1740 and the motion detector 1750 provides signals 1760 indicative of detected motion to the operation detector 1730 which in turn controls, at least to an extent, the operation of the games engine 1710.

Figure 18:
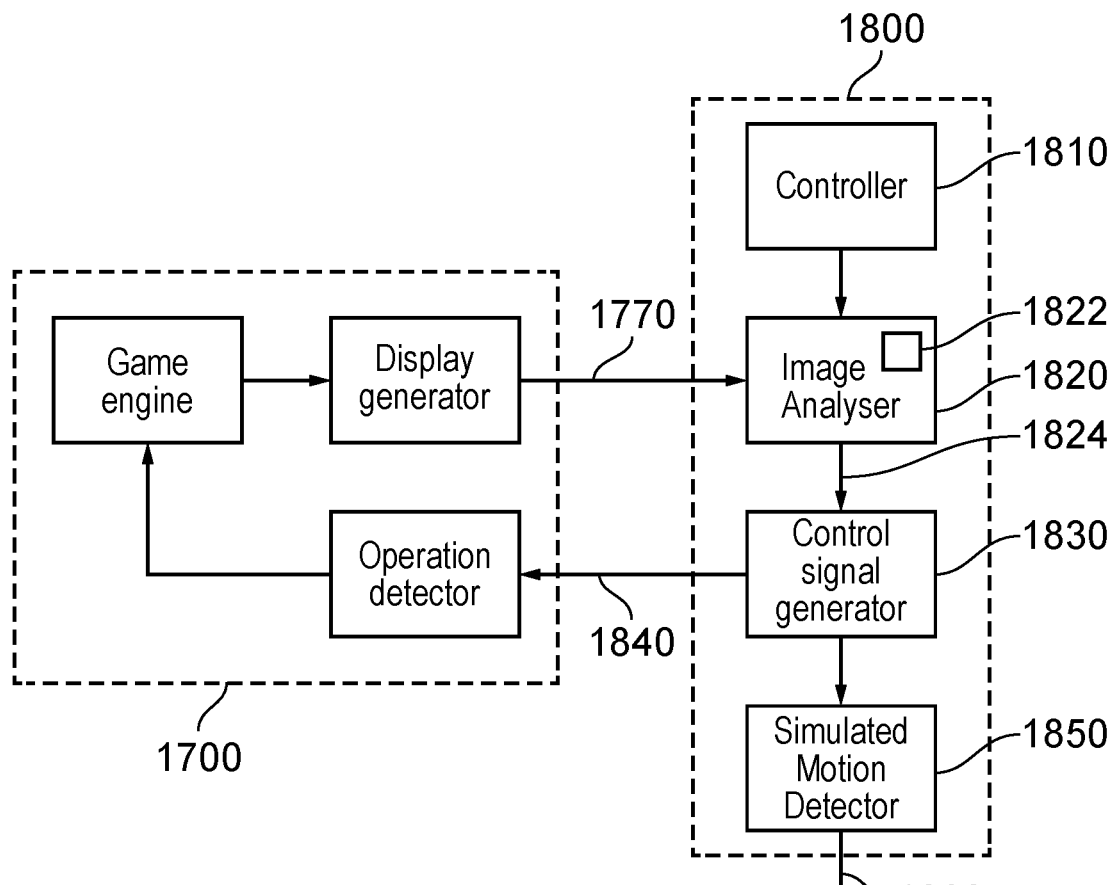
FIG. 18 schematically illustrates a games machine and a motion signal generation apparatus.

Various examples will be discussed below of arrangements to simulate the signals 1760 which would, in the case of conventional use of an HMD, be provided by the motion detector 1750, for example in response to one or more image features of images 1770 generated by the games machine 1700 as an example of a data processing apparatus. FIG. 18 provides one such example of motion signal generation apparatus comprising a detector (1820—to be described below) to detect one or more image features of images generated by a data processing apparatus such as the games machine 1700, and a generator (1830—to be described below), responsive to an image location of the one or more detected image features and to a current simulated orientation of a head mountable display (HMD), to generate a motion signal (1840—to be described below) to simulate head motion by the wearer of the HMD, so that the generator is configured to provide the generated motion signal to the data processing apparatus.

FIG. 18 provides an example of a system comprising testing apparatus; and data processing apparatus such as the games machine 1700 to provide generated images to the detector in response to the generated motion signal provided by the generator.

Turning to FIG. 18 in detail, a testing apparatus 1800, as an example of motion signal generation apparatus, comprises a controller 1810 to control operation of the apparatus 1800, an image analyser 1820 to perform image analysis operations on the images 1770 generated by the games machine 1700, a control signal generator to generate simulated head motion signals (in other words, simulated versions of the signal 1760 of FIG. 17) in response to image features detected by the image analyser 1820 and a simulated motion detector 1850 to generate an output 1860 indicative of one or more properties of the motion signals simulated by the control signal generator 1830.

In operation, the image analyser 1820 detects one or more image features of the type shown in FIGS. 12a, 13a, 14a, 15a and 16a. For example a database may be maintained by the image analyser 1820 and stored in memory 1822 for example, defining image features, potentially according to the following schematic example:

| Image attributes | Image feature | Transition viewpoint if detected? | Transition speed |
|---|---|---|---|
| (respective sample images at different scales/orientations) | menu item | not unless no other feature available | normal |
| | doorway | yes | normal |
| | enemy avatar | yes | faster than normal |

The image analyser 1820 detects the presence of one or more of the image features along with its location within a current image, and provides data 1824 to the control signal generator 1830 indicative of that detection. An example of an instance of the data 1824 is shown below:

Transition, normal speed, new location=60 degrees left, 20 degrees up

The control signal generator 1830 is responsive to the image location of the one or more detected image features and also a current simulated orientation of the HMD (which may be a central orientation such as that shown in FIGS. 12a . . . 16a) to generate the signal 1840. The signal 1840, or a version of it, is passed to the simulated motion detector 1850.

Figure 19:
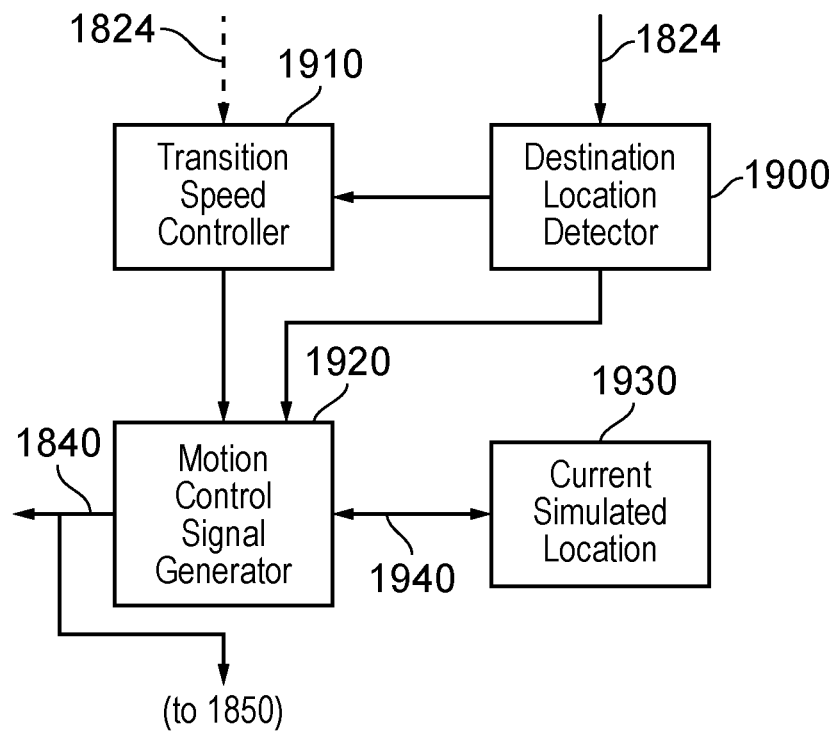
FIG. 19 schematically illustrates a control signal generator.

FIG. 19 schematically illustrates an example of the control signal generator 1830, in which, from the signal 1824, a destination location detector 1900 detects a destination or target location or orientation which the simulated HMD wearer will look at next. Assuming that the detected destination or target orientation is different to the current orientation of the HMD, a transition, represented by simulated head motion, between the current orientation and the target orientation is required. However, to simulate a real user, the transition between the current orientation and the target orientation does not take place instantaneously. Instead, the transition takes place at a transition speed consistent with achievable and realistic physical movement of the user's head in real life. The transition speed is controlled by a transition speed controller 1910.

The transition speed controller 1910 can, in some examples, set a constant transition speed (for example, in degrees per second), but in other examples the transition speed controller 1910 can apply a transition speed dependent upon the nature of the detected image feature which prompted the transition, subject in some examples to a maximum transition speed (in which case the generator is responsive to data defining a maximum rate of movement of the wearer of the HMD). For example, if the detected image feature is in a first category of image features, as indicated by the table given above, then the transition is deemed to be non-urgent for the purposes of the simulation and a first, lower, transition speed is used. In a second category of image feature as set out in the table given above, the transition is deemed to be urgent and a second, higher, transition speed is selected by the transition speed controller. So, in some examples, the transition speed controller can operate without a dependence on the signal 1824; but in other examples its operation can be dependent upon data defining the detected image feature forming part of the image signal 1824. Therefore, in examples, the detector is configured to derive the data defining the maximum rate of movement of the wearer of the HMD in response to the detected image features.

The transition speed and the destination are provided to a motion control signal generator 1920. This is also responsive to data stored by a memory 1930 defining a current simulated location or orientation of the HMD, and, as indicated by the bidirectional arrow 1940, the motion control signal generator 1920 is operable to update the current simulated location stored in the memory 1930 in response to the generation of the signal 1840 indicating simulated motion of the HMD.

In the example of FIG. 19, the signal 1840 is also supplied to the simulated motion detector 1850.

Figure 20:
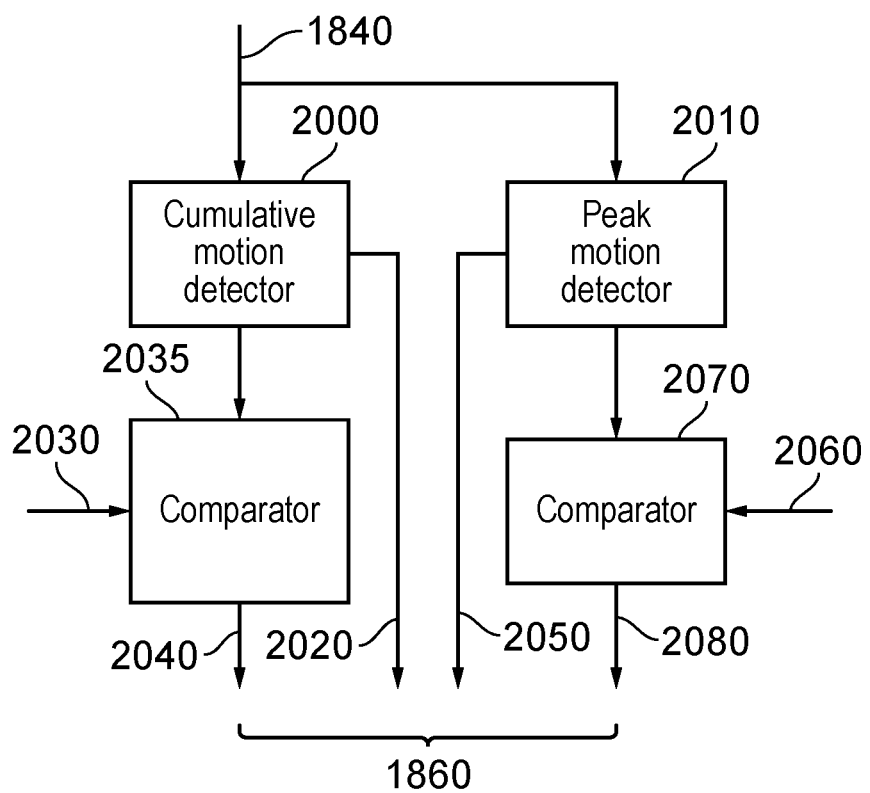
FIG. 20 schematically illustrates a simulated motion detector.

FIG. 20 schematically illustrates a simulated motion detector such as the simulated motion detector 1850, which is responsive, for example, to the signal 1840 generated by the control signal generator 1830. This provides an example having a motion detector to detect at least one indicator of the extent of the simulated motion represented by the motion signal. The motion detector may comprise or be associated with a comparator to compare the detected indicator with a threshold value. The one or more indicators may comprise either or both of: a cumulative simulated head motion; and a peak displacement of the simulated head motion.

The example shown in FIG. 20 comprises a cumulative motion detector 2000 and a peak motion detector 2010.

The cumulative motion detector 2000 detects, over the course of gameplay or another period, the total head motion required of the user according to the simulated gameplay performed by the apparatus 1800. This can be expressed as, for example, a cumulative absolute number of degrees of head motion, such that any transition from one viewpoint to another (in either direction) is treated as a positive number of degrees of arc, and the cumulative total arc is established for the period of gameplay. This total 2020 can be provided as an output 1860 of the simulated motion detector 1850 and/or can be compared by a comparator 2035 with a threshold 2030 to generate another signal 2040 indicative of whether the threshold 2030 has been exceeded.

The peak motion detector 2010 detects one or both of: a peak transition speed set by the transition speed controller 1910 and/or a peak arc traversed in a single transition. The detected peak information can be provided as an output 2050 forming part of the output 1860 of the simulated motion detector 1850 and/or can be compared with a threshold 2060 by a comparator 2070 to generate and output 2080 indicative of whether the threshold 2060 was exceeded.

Figure 21:
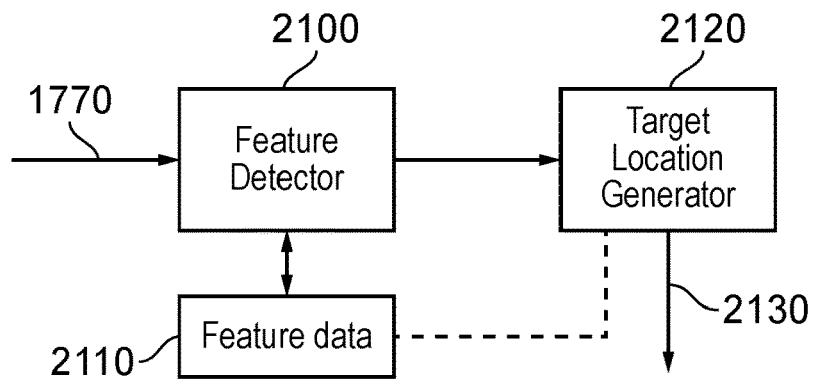
FIG. 21 schematically illustrates an image analyser.

FIG. 21 schematically illustrates an example of the image analyser 1820 of FIG. 18.

A feature detector 2100 is responsive to feature data stored in a memory 2110, such as the memory 1822 of FIG. 18, and a target location generator 2120 (which may also be responsive to the feature data 2110) generates an output 2130 (which may correspond to the output 1824 discussed above) indicative of the location of detected features.

The target location generator and the destination location detector 1900 of FIG. 19 may cooperate so that, between their respective functions, an appropriate target location is identified. It is not technically important from the point of view of the overall disclosure whether the selection of a particular target location is carried out by the image analyser 1820 or the control signal generator 1830 of FIG. 18.

In some examples, the image analyser 1820 acts as an example of a detector configured to detect a control display (such as the activate menu display 1300 and/or the menu items 1400 discussed above) in the images 1770 generated by a data processing apparatus 1700, in which case the control signal generator 1830 is configured to generate the motion signal 1840 to simulate head motion of the wearer of the HMD towards the control display. In other examples, the image analyser 1820 provides an example of an image detector configured to detect a predetermined feature, of a set of one or more predetermined features (such as those defined by the feature data in the memory 2110) in the images 1770 generated by a data processing apparatus 1700. In this case, the control signal generator 1830 is configured to generate the motion signal 1840 to simulate head motion by the wearer of the HMD towards the detected predetermined feature. So, in this type of example, arrangements such as those shown in FIGS. 12*a*, 15*a* and 16*a* are envisaged.

Figure 22:
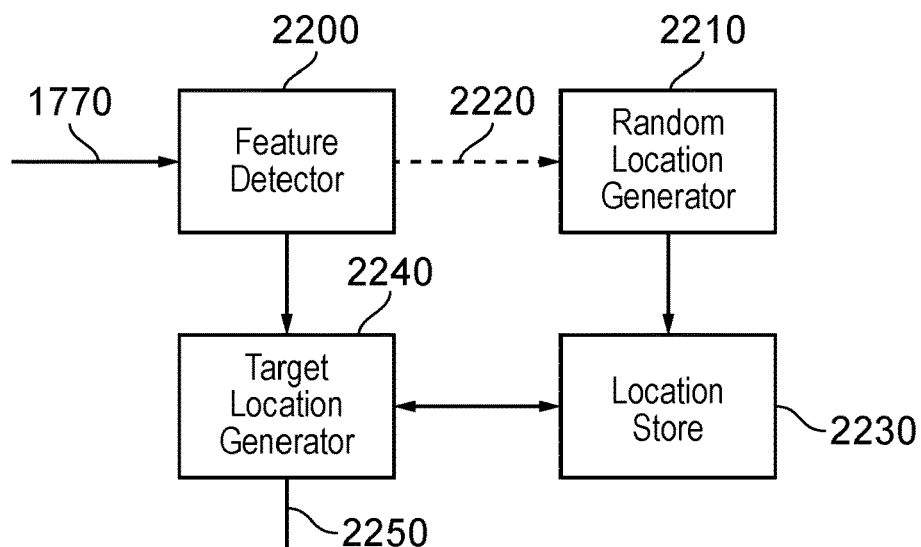
FIG. 22 schematically illustrates another example of an image analyser.

FIG. 22 shows another example of an image analyser which could be used in place of the image analyser 1820, in which a set of data defining which features should be looked at by the simulated HMD wearer is not required. Instead, random or pseudorandom locations are selected and their effect on the displayed images is detected.

In FIG. 22, the images 1770 are provided to a feature detector 2200. A random location detector 2210 detects one or both of: random locations for the simulated HMD wearer to orientate the HMD towards; and/or random ones of detected features as detected by the feature detector 2200. The random location generator 2210 therefore may be dependent upon data 2220 received from the feature detector or may operate independently of the feature detector. The random locations are stored in a location store 2230. A target location generator 2240 generates target locations which are provided as data 2250 to the control signal generator. In response to simulated head motion to the target location identified by the target location generator 2240 the feature detector 2200 detects a change in the images 1770 and/or in the detectable features within the images 1770. If such a change is detected, then the location set by the target location generator 2240 is deemed to be a useful location and its entry in the location store 2230 is marked as such. Examples illustrating the use of this technique will be described below with reference to FIGS. 24-26.

This provides an example in which the generator is configured to generate the motion signal to simulate successive instances of random or pseudorandom head motion by the wearer of the HMD; and the detector is configured to detect a change in the images generated by a data processing apparatus in response to an instance of simulated random or pseudorandom head motion.

Figure 23:
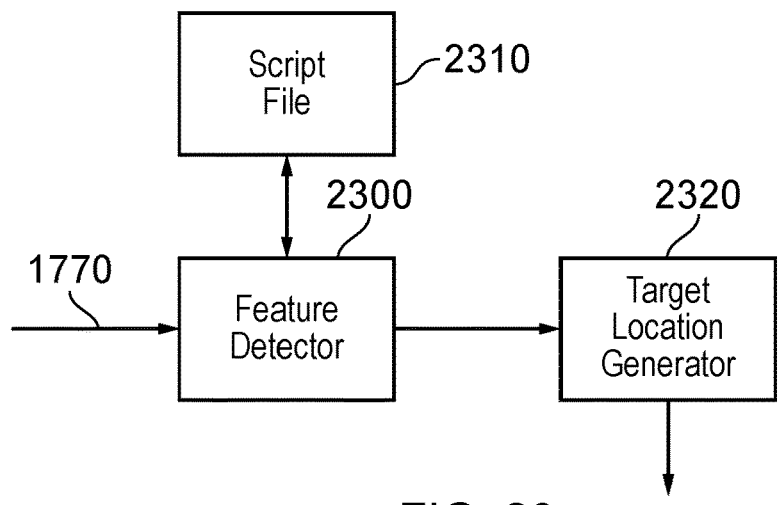
FIG. 23 schematically illustrates another example of an image analyser.

In FIG. 23, showing another example of an image analyser, a feature detector 2200 refers to a so-called script file 2310 containing script data indicative of a gameplay path through the current game software. An example of such a script file is shown below:

| Image feature | Action |
| --- | --- |
| Doorway | Transition to detected position, normal speed |
| Enemy in room beyond doorway | Transition away from detected enemy position towards nearest exit passageway, fast speed |
| Item in room | Transition to detected position, normal speed |

The script file therefore tells the feature detector 2300 the next feature which the feature detectors 2300 should attempt to detect, and when it does so, it provides information to the target location generator 2320 indicative of that detected feature. The feature detector 2300 then moves on to attempting to detect the next feature in the order defined by the script file 2310.

This provides an example in which the detector is configured to detect a predetermined feature, of a set of one or more predetermined features, in the images generated by a data processing apparatus; and the generator is configured to generate the motion signal to simulate an instance of head motion by the wearer of the HMD according to data associating the set of predetermined features with respective instances of simulated head motion. In other words the instances of head motion do not have to be to look towards the detected feature.

Figure 24:
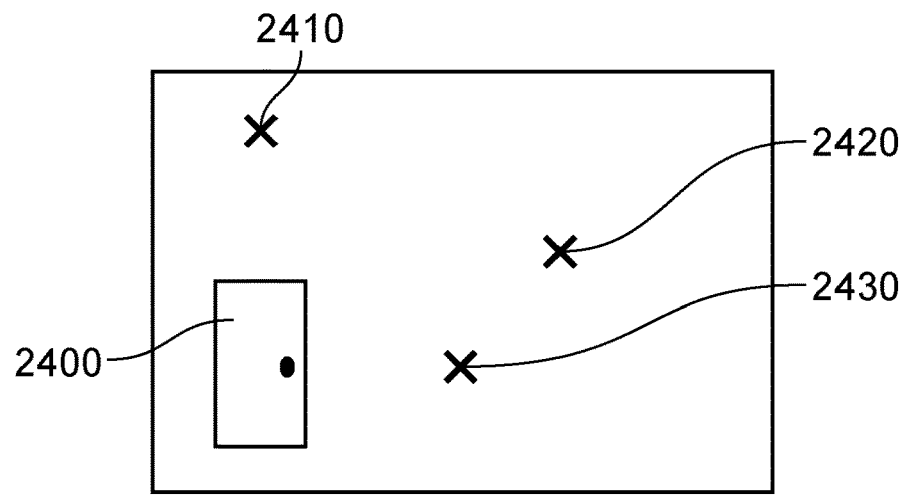
FIGS. 24 to 26 schematically illustrate respective example images.
Figure 25:
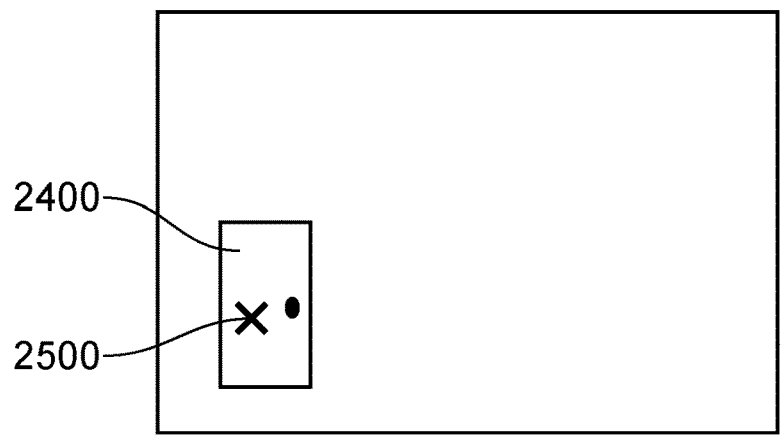
Figure 26:
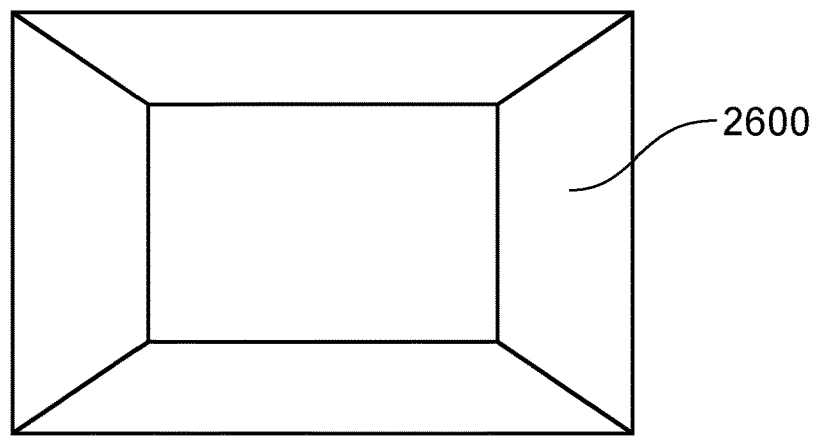

FIGS. 24-26 schematically illustrate respective example images, which for the purposes of this explanation are similar to the image of 12*a* showing a doorway 2400. With reference to FIG. 22, the random location generator is shown schematically as generating three successive random locations for destinations or targets of HMD motion, indicated by an "X" notation and shown at positions 2410, 2420, 2430 in FIG. 24. Since none of these random locations overlaps the doorway 2400, transitioning the simulated HMD to be directed toward those locations does not cause the doorway to be opened by the games machine. A fourth random location 2500 in FIG. 25 does happen to overlie the doorway 2400 and so causes the doorway to be opened within the virtual world such that the user passes through the doorway in the virtual world into an example room 2600 shown in the image of FIG. 26.

Returning to FIG. 22, for each of the random locations 2410, 2420, 2430 the feature detector 2200 detects that no images changes take place in the features present in the image based upon HMD motion being simulated to each of those random locations (other than a simple translation of the displayed image). However, in response to the location 2500, the image does change into that of the room 2500 and so the location 2500 is stored in the location store 2230.

The random locations used during this process do not contribute to the cumulative or peak motion detected by the simulated motion detector 1850, but transitions between the locations stored in the location store 2230 and associated with useful transitions such as the location 2500 do contribute to the cumulative and/or peak motions detections.

Figure 27:
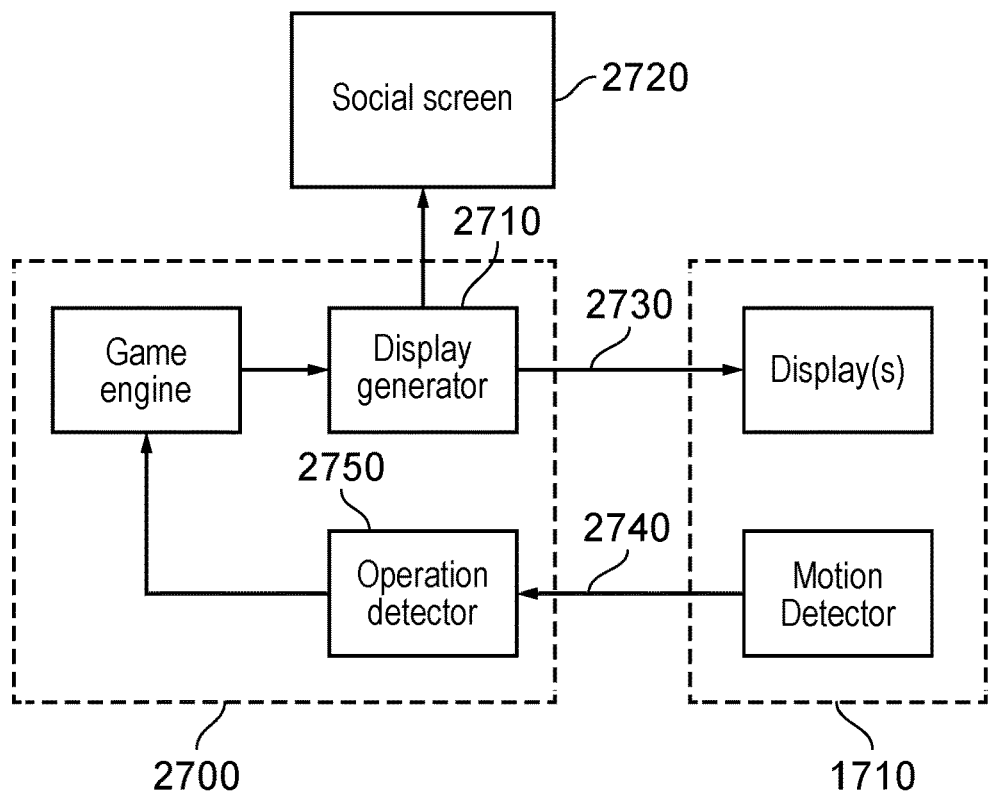
FIG. 27 schematically illustrates another example of a games machine and an HMD.

FIG. 27 schematically illustrates another example of a games machine 2700 and a HMD 1710. The games machine 2700 is similar to the games machine 1700 except that the display generator 1710 not only provides images to the HMD but also provides images to a separate so-called social screen 2720 as discussed above. Once again, the images 2730 provided to the HMD are displayed by one or more displays of the HMD and a motion signal 2740 indicative of HMD motion is provided to an operation detector 2750 of the games machine 2700.

Figure 28:
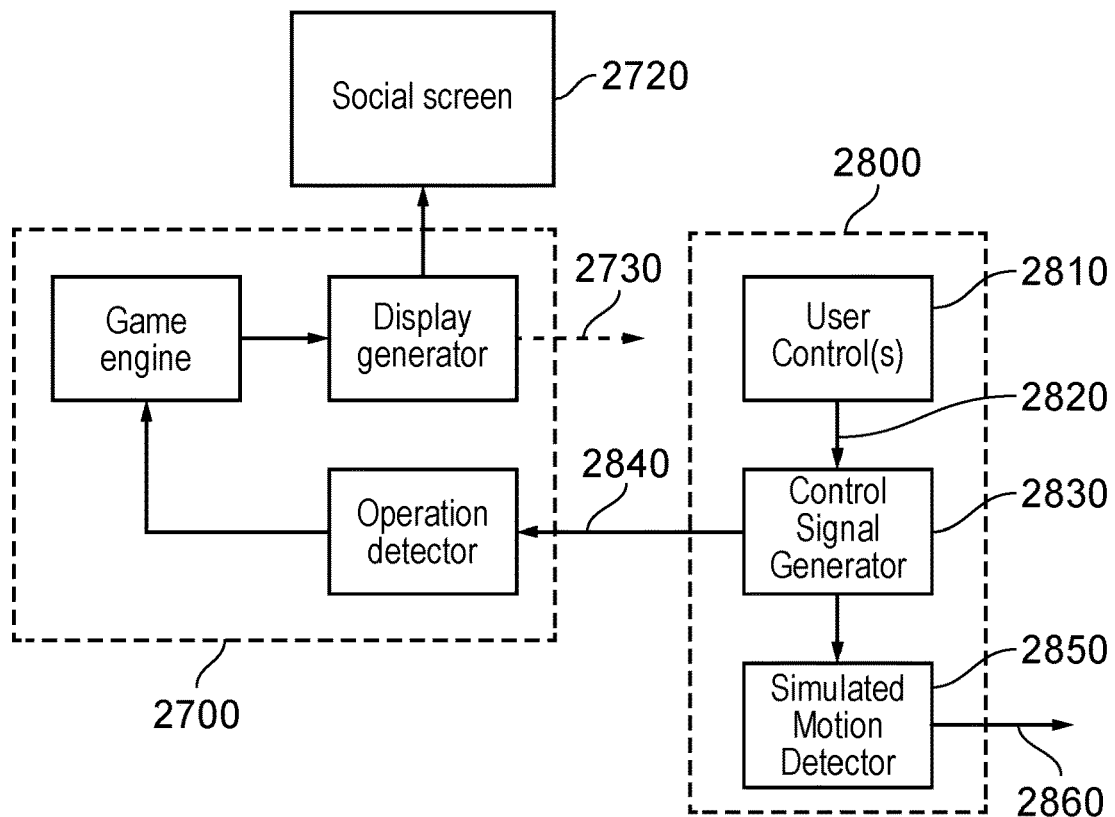
FIG. 28 schematically illustrates another example of a games machine and a motion signal generation apparatus.

FIG. 28 schematically illustrates another example of a games machine and a motion signal generation apparatus. Here, the games machine 2700 is as shown in FIG. 27, providing images to the social screen 2720. In the present case, however, the images 2730 are not used, but instead in a motion signal generation apparatus 2800, one or more user controls are provided so that a user, observing the social screen 2720, can indicate by the user controls where the simulated HMD wearer should next look based on successive target locations 2820 provided by the user controls 2810, a control signal generator 2830 generates signals 2840 to simulate the signals 2740 of FIG. 27 and a simulated motion detector 2850 generates an output 2860 indicative of one or more properties of the simulated HMD motion. This provides an example in which the detector comprises a user control detector to detect operation of a user control indicating the one or more image features.

Figure 29:
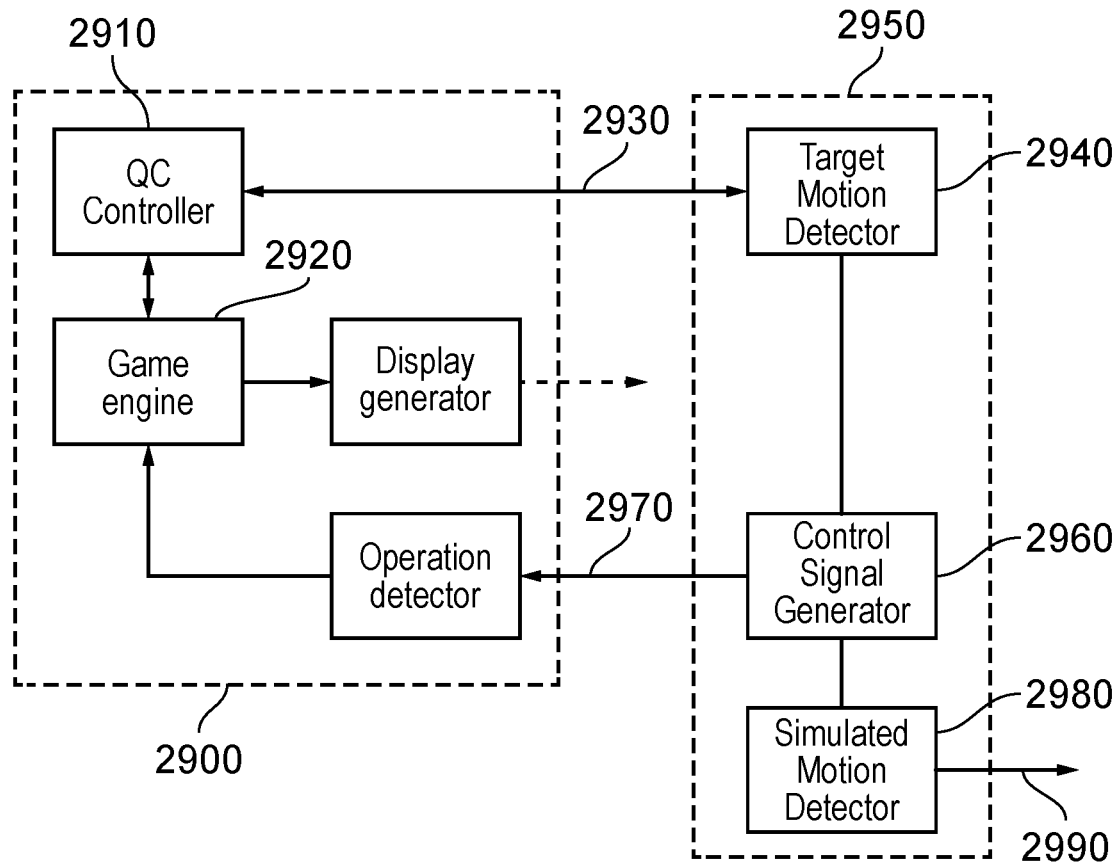
FIG. 29 schematically illustrates another example of a games machine and a motion signal generation apparatus.

In another example, shown in FIG. 29, a games machine 2900 comprises a QC controller module 2910 which interacts with the game engine 2920 to control and/or detect parts of its operation. In doing so, the QC controller can provide a signal 2930 to a target motion detector 2940 of motion signal apparatus 2950 indicative of locations which the HMD wearer is expected to look at in use (as an example of a test controller to generate information indicative of image features of the generated images). A control signal generator 2960 operates as discussed above to generate signalled motion signals 2970, which can be analysed by the simulated motion detector 2980 to generate an output 2990 indicative of properties of those simulated motion signals.

Figure 30:
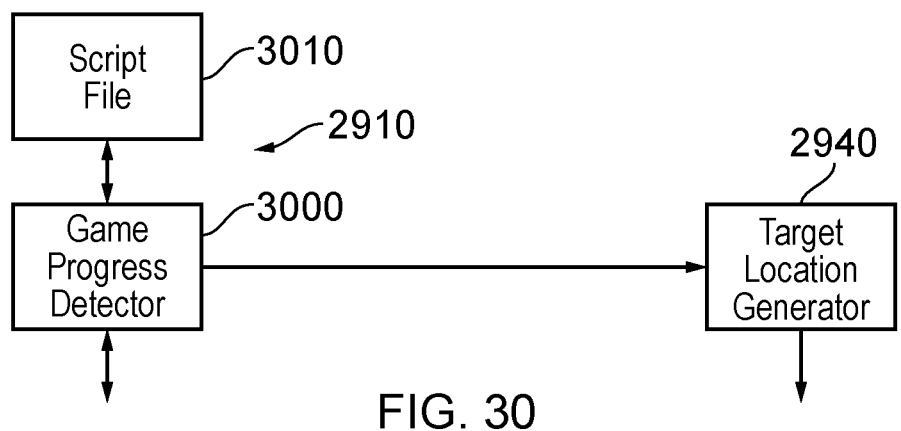
FIG. 30 schematically illustrates the operation of a QC controller.

FIG. 30 schematically illustrates the operation of the QC controller 2910 in which a game progress detector 3000 interacts with the game engine 2920 according to information stored in a script file 3010. An example of such a script file is shown below:

| Image feature | Action |
|---|---|
| Doorway | Transition to detected position, normal speed |
| Enemy in room beyond doorway | Transition to detected position, fast speed, then shoot |
| Item in room | Transition to detected position, normal speed, pick up |

Figure 31:
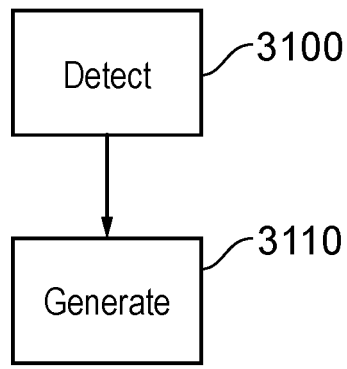
FIG. 31 is a schematic flowchart illustrating a method.

FIG. 31 is a schematic flowchart illustrating a method comprising:

detecting (at a step 3100) one or more image features of images generated by a data processing apparatus; and generating (at a step 3110), in response to an image location of the one or more detected image features and to a current simulated orientation of a head mountable display (HMD), a motion signal to simulate head motion by a wearer of the HMD.

Figure 32:
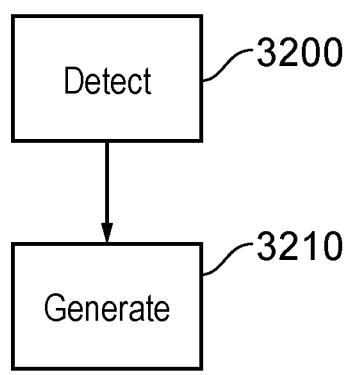
FIG. 32 is a schematic flowchart illustrating a method.

FIG. 32 is a schematic flowchart illustrating a method comprising:

detecting (at a step 3200) one or more features of a virtual environment generated by a data processing apparatus; and generating (at a step 3210), in response to an environment location of the one or more detected features and to a current simulated orientation of a head mountable display (HMD), a motion signal to simulate head motion by a wearer of the HMD.

In some examples the detecting step 3200 comprises detecting one or more audio features of an audio signal generated by the data processing apparatus; and the generating step 3210 is responsive to a location in the virtual environment of the one or more detected audio features and to a current simulated orientation of a head mountable display (HMD), to generate the motion signal to simulate head motion by a wearer of the HMD.

Figure 33:
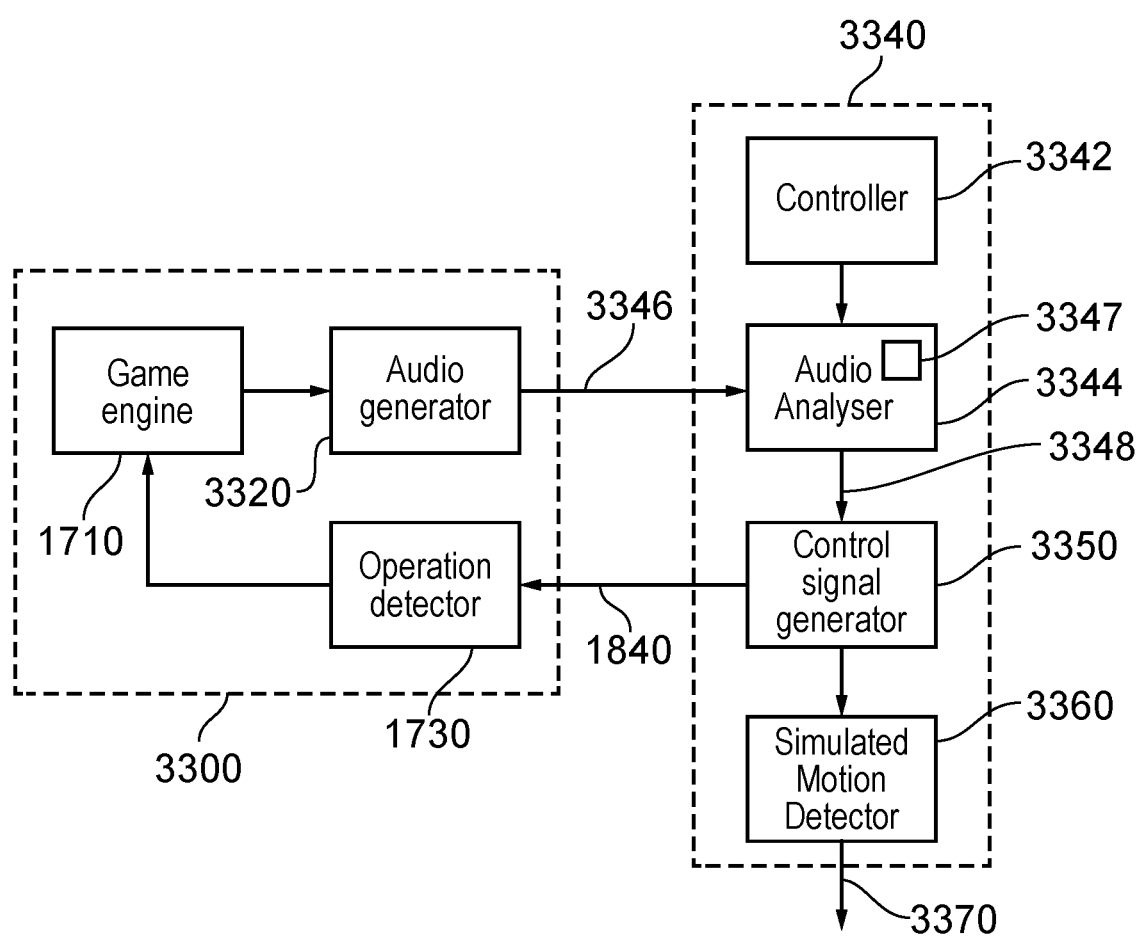
FIG. 33 schematically illustrates a games machine and a motion signal generation apparatus.

FIG. 33 is similar to FIG. 18 and schematically illustrates a testing apparatus having an example games machine 3300. The games machine 3300, again shown in simplified form for clarity of the present explanation, comprises a game engine 1710, an audio generator 3320 and an operation detector 1730. The audio generator (which would typically operate in addition to a display generator, not shown in FIG. 33) generates audio signals indicative or representative of the virtual environment. The audio signals 3346 would, in normal operation, be provided to the earpieces 60 and/or to a social screen loudspeaker, for example via respective amplifiers. In the present example, they are analysed for audio features and their location. The audio signals are stereophonic, binaural or the like so that when replayed to the user wearing an HMD, they have an associated apparent location in the virtual environment. Testing apparatus 3340, as a further example of motion signal generation apparatus, comprises a controller 3342 to control operation of the apparatus 1800, an audio analyser 3344 to perform audio analysis operations on the audio signals 3346 generated by the games machine 3300, a control signal generator 3350 to generate simulated head motion signals (in other words, simulated versions of the signal 1760 of FIG. 17) in response to audio features detected by the audio analyser 3344 and a simulated motion detector 3360 to generate an output 3370 indicative of one or more properties of the motion signals simulated by the control signal generator 3350.

In operation, the audio analyser 3344 detects one or more audio features occurring during gameplay. These may be from a predetermined set of audio features. For example a database may be maintained by the audio analyser 3344 and stored in memory 3348 for example, defining detectable properties of audio features such as gunshots, shouts, dog barks or the like.

The audio analyser 3344 detects the presence of one or more of the image features along with its location within the virtual environment, and provides data 3348 to the control signal generator 3350 indicative of that detection. The location in the virtual environment may be a location relative to the listener position. the audio analyser may establish or detect that location by analysis of the audio signal, for example by correlation and phase/amplitude detection of left and right audio signals using known localisation techniques.

Sounds in the predetermined list can be detected by their audio properties, such as their frequency distribution, attack, sustain and decay properties. For example a gunshot is assumed to have taken place if a particular set of attack-sustain-decay and frequency distribution (within margins or boundaries) are detected. If another sound (not generated as a representation of a gunshot) also happens to have those same properties and is erroneously detected as a gunshot, this is not in fact a problem because the aim of the system is to simulate the way that the user might turn towards the source of the gunshot to see what has happened. Another sound which is confusingly similar to a gunshot would probably have the same subjective effect on the user, and so it is in fact a useful outcome that it is also detected as a gunshot.

Another example of a predetermined sound is a human voice.

Rather than having a set of different predetermined sounds and individual detections, the set can in fact represent one set of parameters, for example that the sound has at least a certain attack, so that it is considered a sudden sound that the user is likely to look round towards.

For example, a sound, such as a sound in the predetermined list, occurring behind and to the left of the listener position would be deemed by the control signal generator to prompt head motion in a leftwards direction. The further the sound is behind the user, the further the head will turn. Similar considerations can apply to sounds above, to the right or below the user. For example, for a sound location at a particular azimuth angle $\Theta$ relative to the user's forward direction and a particular altitude angle $\phi$ relative to the user's horizontal position, the control signal generator can act in an example as follows:

if $(\Theta, \phi)$ represent a location within the current field of view, direct the head to that location if $(\Theta, \phi)$ represent a location outside the current field of view by no more than 20 degrees in altitude or azimuth, direct the head to that location otherwise, rotate the head laterally and/or vertically by $f(\Theta)$, $g(\phi)$, where f and g are functions such that the head rotates towards but does not rotate completely towards the relevant sound location.

For example, $f(\Theta)$ could be $20°+(\Theta-20°)/2$.

In another example, $f(\Theta)$ could be $20°+(\Theta-20°)^n$, where n is for example 0.5.

Similarly, in an example, $g(\phi)$ could be $20°+(\phi-20°)/2$.

In another example, $g(\phi)$ could be $20°+(\phi-20°)^n$, where n is for example 0.5.

The functions f and g can be the same as one another or different. The value given in the above equations as 20° could be expressed as a variable selectable as a parameter and could be different for the two functions f and g.

The control signal generator 3350 is therefore responsive to the environment location of the one or more detected audio features and also a current simulated orientation of the HMD (which may be a central orientation such as that shown in FIGS. 12a . . . 16a) to generate the signal 1840. The signal 1840, or a version of it, is passed to the simulated motion detector 1850.

Figure 34:
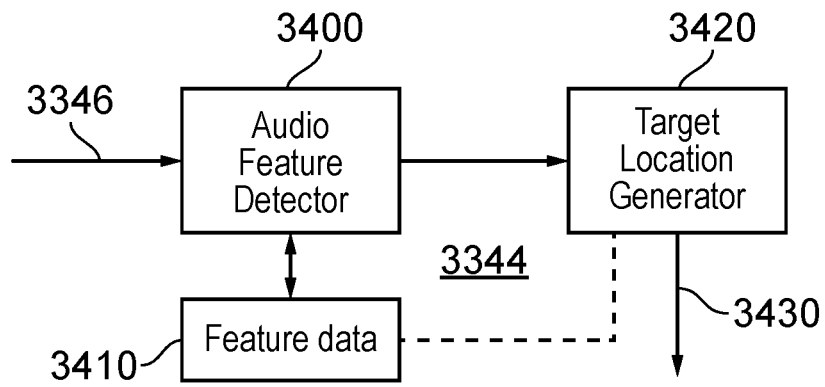
FIG. 34 schematically illustrates an audio analyser.

FIG. 34 schematically illustrates an example of the audio analyser 3344 of FIG. 33.

An audio feature detector 3400 is responsive to feature data stored in a memory 3410, such as the memory 3348 of FIG. 18, and a target location generator 3420 (which may also be responsive to the feature data 3410) generates an output 3430 (which may correspond to the output 3348 discussed above) indicative of the location of detected audio features, for example by phase/amplitude analysis of the left and right audio signals.

FIG. 22 shows another example of an audio analyser which could be used in place of the audio analyser 3344, in which a set of data defining which features should be looked at by the simulated HMD wearer is not required. Instead, random or pseudorandom locations are selected and their effect on the displayed images is detected.

In FIG. 22, the audio signal 3346 is provided to an audio feature detector 3500. A random location detector 3510 detects one or both of: random locations for the simulated HMD wearer to orientate the HMD towards; and/or random ones of detected audio feature locations as detected by the audio feature detector 3500. The random location generator 3510 therefore may be dependent upon data 3520 received from the audio feature detector or may operate independently of the audio feature detector. The random locations are stored in a location store 3530. A target location generator 3540 generates target locations which are provided as data 3550 to the control signal generator. In response to simulated head motion to the target location identified by the target location generator 3540 the audio feature detector 3500 detects a change in the audio signal 3346. If such a change is detected, then the location set by the target location generator 3540 is deemed to be a useful location and its entry in the location store 3530 is marked as such.

Note that the audio feature detection arrangements and the image feature detection arrangements discussed above may be used together, so that head motion is simulated towards an image feature or an audio feature, whichever is detected.

Figure 35:
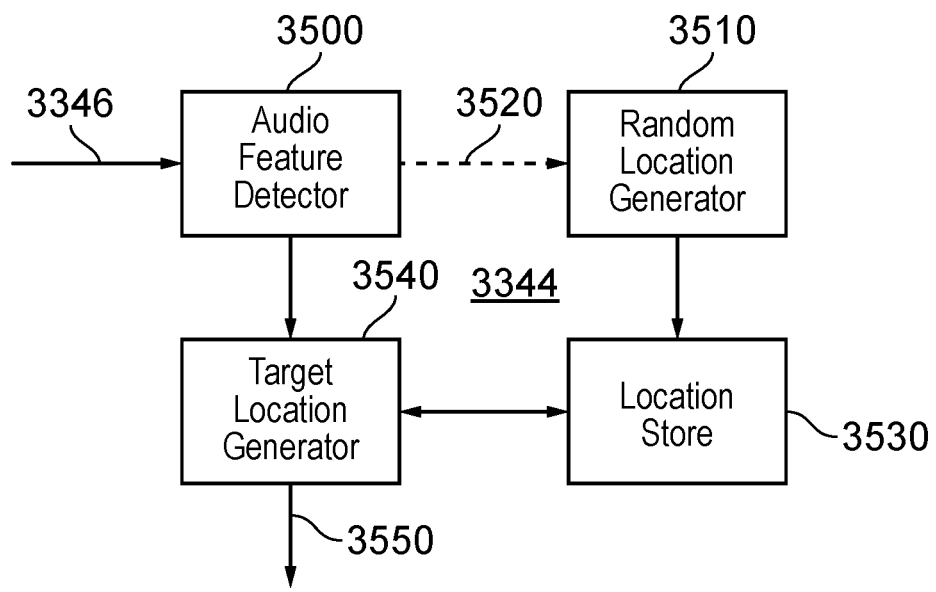
FIG. 35 schematically illustrates another example of an audio analyser.

FIGS. 33-35 therefore provide examples of motion signal generation apparatus comprising:

a detector 3344 to detect one or more features of a virtual environment generated by a data processing apparatus; and a generator 3350, responsive to an environment location of the one or more detected features and to a current simulated orientation of a head mountable display (HMD), to generate a motion signal to simulate head motion by a wearer of the HMD.

In examples, the detector 3344 is configured to detect one or more audio features of an audio signal generated by the data processing apparatus; and the generator 3350 is responsive to a location in the virtual environment of the one or more detected audio features and to a current simulated orientation of a head mountable display (HMD), to generate the motion signal to simulate head motion by a wearer of the HMD.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. An apparatus, comprising:
    a detector to detect one or more features of a virtual environment generated by a data processing apparatus; and
    a generator, responsive to an environment location of the one or more features and to a current simulated orientation of a head mountable display (HMD), to generate a motion signal to simulate head motion by a simulated wearer of the HMD, wherein:
    the generator is responsive to data defining a maximum rate of movement of the simulated wearer of the HMD,
    the detector is configured to detect one or more image features of images generated by the data processing apparatus,
    the generator is responsive to an image location of the one or more image features and to the current simulated orientation of a head mountable display (HMD), to generate the motion signal to simulate head motion by the simulated wearer of the HMD,
    the generator is configured to generate the motion signal to simulate successive instances of random or pseudorandom head motion by the simulated wearer of the HMD, and
    the detector is configured to detect a change in the images generated by a data processing apparatus in response to an instance of simulated random or pseudorandom head motion.

2. The apparatus according to claim 1, in which:
    the detector is configured to detect one or more audio features of an audio signal generated by the data processing apparatus; and
    the generator is responsive to a location in the virtual environment of the one or more audio features and to the current simulated orientation of a head mountable display (HMD), to generate the motion signal to simulate head motion by the simulated wearer of the HMD.

3. The apparatus according to claim 2, in which the detector is configured to detect audio features of a predetermined set of audio features.

4. The apparatus according to claim 3, in which:
    the detector is configured to detect a predetermined feature, of a set of one or more predetermined features, in the images generated by a data processing apparatus; and
    the generator is configured to generate the motion signal to simulate an instance of head motion by the simulated wearer of the HMD according to data associating the set of predetermined features with respective instances of simulated head motion.

5. The apparatus according to claim 3, comprising a motion detector to detect at least one indicator of the extent of the simulated motion represented by the motion signal.

6. The apparatus according to claim 5, comprising a comparator to compare the at least one indicator with a threshold value.

7. The apparatus according to claim 6, further comprising a data processing apparatus to provide generated images to the detector in response to the generated motion signal provided by the generator.

8. The apparatus according to claim 7, in which the data processing apparatus comprises a test controller to generate information indicative of image features of the generated images.

9. The apparatus according to claim 5, in which the at least indicator comprises at least one of:
    a cumulative simulated head motion; and
    a peak displacement of the simulated head motion.

10. The apparatus according to claim 1, in which:
    the detector is configured to detect a control display in the images generated by a data processing apparatus; and
    the generator is configured to generate the motion signal to simulate head motion by the simulated wearer of the HMD towards the control display.

11. The apparatus according to claim 1, in which:
    the detector is configured to detect a predetermined feature, of a set of one or more predetermined features, in the images generated by a data processing apparatus; and
    the generator is configured to generate the motion signal to simulate head motion by the simulated wearer of the HMD towards the detected predetermined feature.

12. The apparatus according to claim 1, in which the detector comprises a user control detector to detect operation of a user control indicating the one or more image features.

13. The apparatus according to claim 1, in which the detector is configured to derive the data defining the maximum rate of movement of the simulated wearer of the HMD.

14. The apparatus according to claim 1, in which the data processing apparatus is a computer games machine.

15. The apparatus according to claim 1, in which the generator is configured to provide the generated motion signal to the data processing apparatus.

16. A method comprising:
    detecting one or more features of a virtual environment generated by a data processing apparatus; and
    generating, in response to an environment location of the one or more features and to a current simulated orientation of a head mountable display (HMD), a motion signal to simulate head motion by a simulated wearer of the HMD, wherein:
    the generating is responsive to data defining a maximum rate of movement of the simulated wearer of the HMD,
    the detecting includes detecting one or more image features of images generated by the data processing apparatus,
    the generating is responsive to an image location of the one or more image features and to the current simulated orientation of a head mountable display (HMD), to generate the motion signal to simulate head motion by the simulated wearer of the HMD,
    the generating includes generating the motion signal to simulate successive instances of random or pseudorandom head motion by the simulated wearer of the HMD, and
    the detecting includes detecting a change in the images generated by a data processing apparatus in response to an instance of simulated random or pseudorandom head motion.

17. The method according to claim 16, in which:
    the detecting step comprises detecting one or more audio features of an audio signal generated by the data processing apparatus; and
    the generating step is responsive to a location in the virtual environment of the one or more detected audio features and to the current simulated orientation of a head mountable display (HMD), to generate the motion signal to simulate head motion by the simulated wearer of the HMD.

18. The method according to claim 16, in which:
    the detecting step comprises detecting one or more image features of images generated by the data processing apparatus; and the generating step is responsive to an image location of the one or more image features and to the current simulated orientation of a head mountable display (HMD), to generate the motion signal to simulate head motion by the simulated wearer of the HMD.

19. The method according to claim 16, further comprising:

providing the generated motion signal to the data processing apparatus.

20. A non-transitory machine-readable recording medium which stores computer software, which when executed by a computer, causes the computer to carry out actions, comprising:

detecting one or more features of a virtual environment generated by a data processing apparatus; and generating, in response to an environment location of the one or more features and to a current simulated orientation of a head mountable display (HMD), a motion signal to simulate head motion by a simulated wearer of the HMD, wherein:

the generating is responsive to data defining a maximum rate of movement of the simulated wearer of the HMD, the detecting includes detecting one or more image features of images generated by the data processing apparatus, the generating is responsive to an image location of the one or more image features and to the current simulated orientation of a head mountable display (HMD), to generate the motion signal to simulate head motion by the simulated wearer of the HMD, the generating includes generating the motion signal to simulate successive instances of random or pseudorandom head motion by the simulated wearer of the HMD, and the detecting includes detecting a change in the images generated by a data processing apparatus in response to an instance of simulated random or pseudorandom head motion.

\* \* \* \* \*